(12) United States Patent
Han et al.

(10) Patent No.: US 10,831,604 B2
(45) Date of Patent: Nov. 10, 2020

(54) STORAGE SYSTEM MANAGEMENT METHOD, ELECTRONIC DEVICE, STORAGE SYSTEM AND COMPUTER PROGRAM PRODUCT

(71) Applicant: Dell Products L.P., Round Rock, TX (US)

(72) Inventors: Geng Han, Beijing (CN); Jian Gao, Beijing (CN); Jibing Dong, Beijing (CN); Hongpo Gao, Beijing (CN); Baote Zhuo, Beijing (CN)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 16/179,428

(22) Filed: Nov. 2, 2018

(65) Prior Publication Data

US 2019/0220357 A1    Jul. 18, 2019

(30) Foreign Application Priority Data

Jan. 18, 2018    (CN) .......................... 2018 1 0049871

(51) Int. Cl.
*G06F 11/10* (2006.01)
*G06F 11/20* (2006.01)
*G06F 3/06* (2006.01)

(52) U.S. Cl.
CPC .......... *G06F 11/1092* (2013.01); *G06F 3/061* (2013.01); *G06F 3/0619* (2013.01); *G06F 3/0644* (2013.01); *G06F 3/0689* (2013.01); *G06F 11/1076* (2013.01); *G06F 11/2094* (2013.01); *G06F 2201/88* (2013.01)

(58) Field of Classification Search
None
See application file for complete search history.

(56) References Cited

U.S. PATENT DOCUMENTS 5,524,204 A * 6/1996 Verdoorn, Jr. ....... G06F 11/1096
711/114
5,615,352 A * 3/1997 Jacobson .............. G06F 3/0601
711/114
5,809,224 A * 9/1998 Schultz ................. G06F 3/0626
714/6.32

(Continued)

*Primary Examiner* — William E. Baughman
(74) *Attorney, Agent, or Firm* — Ryan, Mason & Lewis, LLP

(57) ABSTRACT

Embodiments of the present disclosure relate to a method for managing a storage system, an electronic device, a storage system and a computer program product. The method includes: expanding a second number of existing disks with a first number of expanded disks to rebuild a redundant array of independent disks (RAID) having a predetermined extent width, the RAID being built based on the existing disks, and the predetermined extent width indicating a number of disk extents from different disks that form an RAID extent. The method further includes: determining a third number of RAID extents contained in the rebuilt RAID. The method further includes: determining a count of data movements to be performed between the expanding disks and the existing disks during the rebuilding based on the first number, the second number, the third number and the predetermined extent width. With this method, time for estimating count of data movements may be reduced.

20 Claims, 11 Drawing Sheets

(56) References Cited

U.S. PATENT DOCUMENTS

| | | | |
|---|---|---|---|
| 2003/0145167 A1* | 7/2003 | Tomita | G06F 3/0608 711/114 |
| 2004/0133743 A1* | 7/2004 | Ito | G06F 3/0614 711/114 |
| 2005/0071558 A1* | 3/2005 | Abe | G06F 3/0607 711/114 |
| 2007/0011401 A1* | 1/2007 | Zhang | G06F 3/061 711/114 |
| 2008/0109601 A1* | 5/2008 | Klemm | G06F 3/0608 711/114 |
| 2008/0195808 A1* | 8/2008 | Chi | G06F 3/0613 711/114 |
| 2008/0276057 A1* | 11/2008 | Hetzler | G06F 3/0605 711/159 |
| 2014/0351512 A1* | 11/2014 | Xu | G06F 3/0604 711/114 |
| 2015/0248245 A1* | 9/2015 | Sakata | G06F 3/06 711/5 |
| 2015/0370504 A1* | 12/2015 | Yamaguchi | G06F 3/061 711/114 |

* cited by examiner

STORAGE SYSTEM MANAGEMENT METHOD, ELECTRONIC DEVICE, STORAGE SYSTEM AND COMPUTER PROGRAM PRODUCT

RELATED APPLICATION(S)

The present application claims priority to Chinese Patent Application No. 201810049871.0, filed Jan. 18, 2018 and entitled "Method for Managing Storage System, Storage System and Computer Program Product," which is incorporated by reference herein in its entirety.

FIELD

Embodiments of the present disclosure generally relate to the field of data storage, and more specifically, to methods for managing a storage system, storage systems and computer program products.

BACKGROUND

A redundant array of independent disks (RAID) significantly increases data throughput of a storage system by storing and reading data on multiple disks simultaneously. The RAID makes it possible to achieve a speed rate several times, tens or even hundreds of times faster than a single drive.

Mapped RAID is a new RAID technology. Compared with conventional RAID, mapped RAID is built on the top of a pool comprising multiple disks, instead of on several particular disks. Disks in the pool are divided into a series of non-overlapping extents with fixed size, which may be referred to as disk extents. Therefore, the pool may be considered as a set of disk extent resources. Mapped RAID comprises a set of RAID extents and each RAID extent may be considered as a conventional RAID. Taking R5 of 4D+1P as an example, each RAID extent includes five disk extents which are allocated from five different disks, where four disk extents are used to store user data and one disk extent is used to store parity check data.

Compared with conventional RAID, mapped RAID has several advantages, for instance, a faster rebuilding rate, support for single drive expansion and support for mix-sized drives in a pool. During the process of using mapped RAID, the user may expand the pool according to actual needs in order to rebuild RAID on the expanded pool. In this case, it will be meaningful to provide time information associated with rebuilding mapped. RAID to the user in advance.

SUMMARY

Embodiments of the present disclosure provide a scheme for managing a storage system which can quickly estimate data movement count between existing disks and expanding disks during the process of rebuilding RAID.

In a first aspect of embodiments of the present disclosure, a method for managing a storage system is provided. The method comprises expanding a second number of existing disks with a first number of expanding disks to rebuild a redundant array of independent disks (RAID) having a predetermined extent width, the RAID being built based on the existing disks, and the predetermined extent width indicating a number of disk extents from different disks that form an RAID extent. The method further comprises determining a third number of RAID extents contained in the rebuilt RAID. The method further comprises determining, based on the first number, the second number, the third number and the predetermined extent width, a count of data movement to be performed between the expanding disks and the existing disks during the rebuilding.

In a second aspect of embodiments of the present disclosure, an electronic device is provided. The electronic device comprises at least one processor; and at least one memory containing computer program instructions, the at least one memory and the computer program instructions being configured to, together with the at least one processor, cause the electronic device to perform acts including: expanding a second number of existing disks with a first number of expanding disks to rebuild a redundant array of independent disks (RAID) having a predetermined extent width, the RAID being built based on the existing disks, and the predetermined extent width indicating a number of disk extents from different disks that form an RAID extent; determining a third number of RAID extents contained in the rebuilt RAID; and determining, based on the first number, the second number, the third number and the predetermined extent width, a count of data movement to be performed between the expanding disks and the existing disks during the rebuilding.

In a third aspect of embodiments of the present disclosure, a storage system is provided. The storage system comprises existing disks, expanding disks and the electronic device according to the second aspect of embodiments of the present disclosure.

In accordance with a fourth aspect of embodiments of the present disclosure, a computer program product is provided. The computer program product is tangibly stored on a non-transient computer readable medium and comprises machine executable instructions that, when executed, cause a machine to execute the method according to the first aspect of embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the following detailed description of the example embodiments of the present disclosure with reference to the accompanying drawings, in which the same reference numerals usually represent the same components.

FIG. 2A visually illustrates in two dimensions a schematic diagram of a neighborhood matrix corresponding to an evenly-distributed RAID;

FIG. 7 is a schematic diagram of a neighborhood matrix without any data movement;

DETAILED DESCRIPTION

Figure 1:
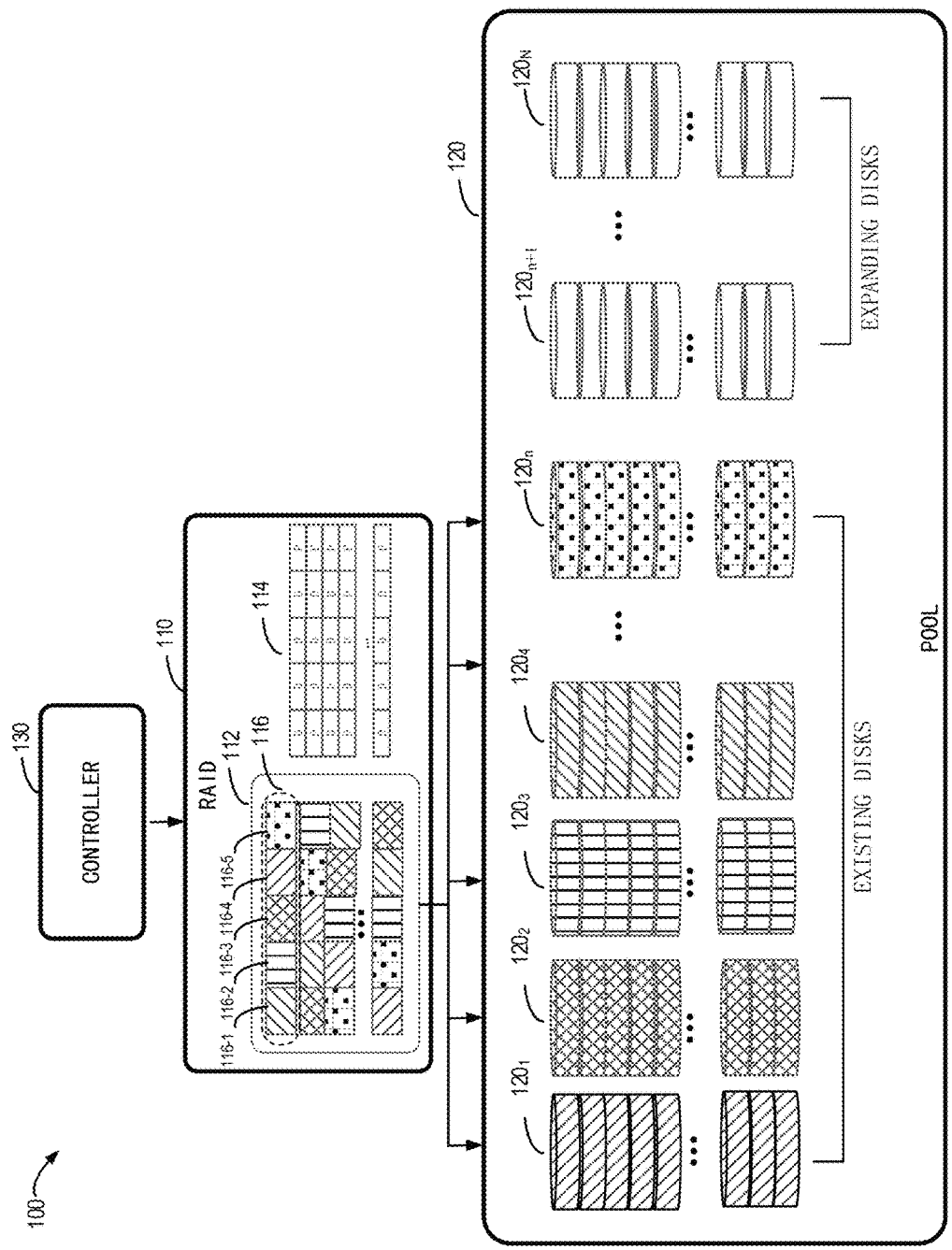
FIG. 1 is a schematic diagram illustrating an example operating environment in which embodiments of the present disclosure may be implemented.

Principles of the present disclosure will be described with reference to various example embodiments illustrated in the drawings. Although preferred embodiments of the present disclosure are shown in the drawings, it shall be appreciated that these embodiments are only provided to enable those skilled in the art to better understand and further implement the present disclosure, rather than to limit the scope of the present disclosure in any manner.

FIG. 1 is a schematic diagram illustrating an example operating environment 100 in which embodiments of the present disclosure may be implemented. The environment 100 includes a pool 120 and a controller 130 that builds RAID 110 on the pool 120. The pool 120 includes existing disks $120_1$, $120_2$, $120_3$, $120_4$ ... $120_n$ and expanding disks $120_{n+1}$ ... $120_N$, where n represents the number of existing disks, N represents a sum of existing disks and expanding disks, and N-n represents the number of expanding disks. The number n of existing disks depends on the used RAID policy. For example, when R5 policy with 4D+1P is utilized, n is an integer larger than or equal to 5 and when R6 policy with 4D+2P is utilized, n is an integer larger than or equal to 6. The number N-n of expanding disks is an integer lager than or equal to 1. Each of existing disks $120_1$, $120_2$, $120_3$, $120_4$ ... $120_n$ and expanding disks $120_{n-1}$ ... $120_N$ is divided into a series of non-overlapping and fix-sized extents, which may be referred to as disk extents. In actual implementation, depending on storage limit, the disk extents may be configured with different sizes.

In the environment 100 shown in FIG. 1, the illustrated RAID 110 is built based on the existing disks $120_1$, $120_2$, $120_3$, $120_4$ ... $120_n$ in the pool 120. The logic space of the RAID 110 that has been built based on existing disks $120_1$, $120_2$, $120_3$, $120_4$ ... $120_n$ is divided into a group of continuous non-overlapping extents, which are referred to as RAID extents. Each RAID extent 116 comprises a predetermined number of disk extents selected from different disks in the existing disks $120_1$, $120_2$, $120_3$, $120_4$ ... $120_n$. The predetermined number depends on the selected RAID policy. Taking R5 with 4D+1P as an example, each RAID extent includes five disk extents which are allocated from five different disks, where four disk extents are used to store user data and one disk extent is used to store parity check data. In this case, the predetermined number is 5. It is to be understood by those skilled in the art that the value 5 is only an example and according to different RAID policies, the predetermined number may be different. In embodiments of the present disclosure, the predetermined number may be referred to as a width of RAID 110, namely, the number of disk extents contained in each RAID extent 116 in the RAID 110.

In the environment 100 shown in FIG. 1, the illustrated RAID extent 116 comprises disk extent 116-1 of disk $120_4$, disk extent 116-2 of disk $120_3$, disk extent 116-3 of disk $120_2$, disk extent 116-4 of disk $120_1$ and disk extent 116-5 of disk $120_n$. The plurality of RAID extents 116 form an RAID extent group 112. RAID 110 may further include a mapping table 114 for recording which disk extents from which disks each RAID extent 116 in the RAID extent group 112 in RAID 110 is comprised.

Presently, when RAM extent group 112 is created, in order to enable disk extents contained in the RAID extent of the RAID extent group 112 to be distributed as evenly as possible on the pool 120, the so called "neighborhood matrix algorithm" is used. The neighborhood matrix M is an N*N square matrix, where N is the number of disks in the pool. As stated above, N depends on the used RAID policy. Each element M (i, j) in the matrix represents the count for disk i to be adjacent to disk j in RAID 110, namely, the count for disk extents of disk i co-occurring with disk extents of disk j in the same RAID extent. If a disk extent of disk i and a disk extent of disk j appear at the same time in the same RAID extent, then disk i and disk j are defined as being adjacent once. For example, in the environment 100 shown in FIG. 1, the illustrated RAID extent 116 comprises disk extents from disk $120_4$, disk $120_3$, disk $120_2$, disk $120_1$ and disk $120_n$. Correspondingly, disk $120_4$ is adjacent to disk $120_3$, disk $120_2$, disk $120_1$ and disk $120_n$, respectively and disk $120_3$ is adjacent to disk $120_4$, disk $120_2$, disk $120_1$ and disk $120_n$ respectively, and so on. As is apparent from the definition, the neighborhood matrix is a symmetric matrix.

Figure 2A:
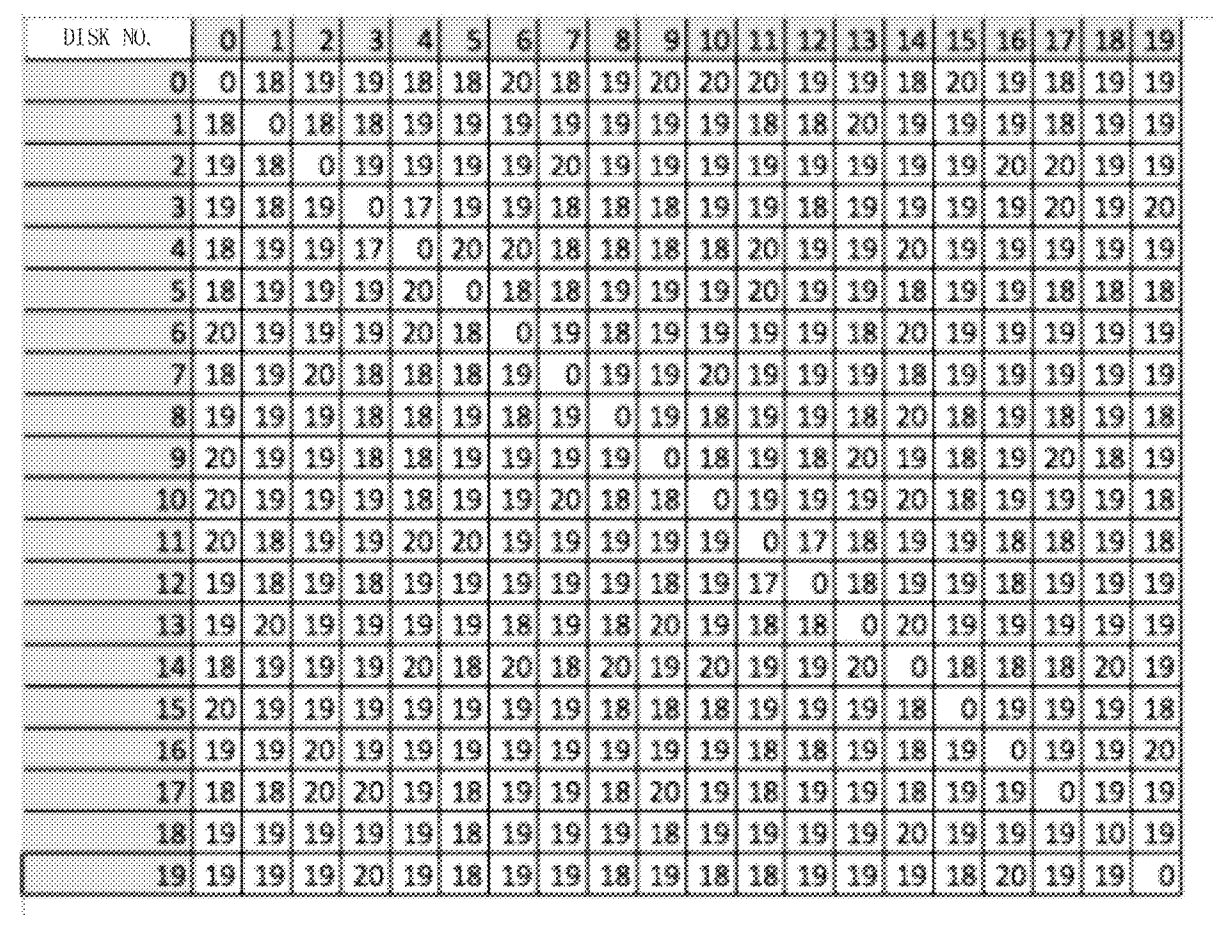
Figure 2B:
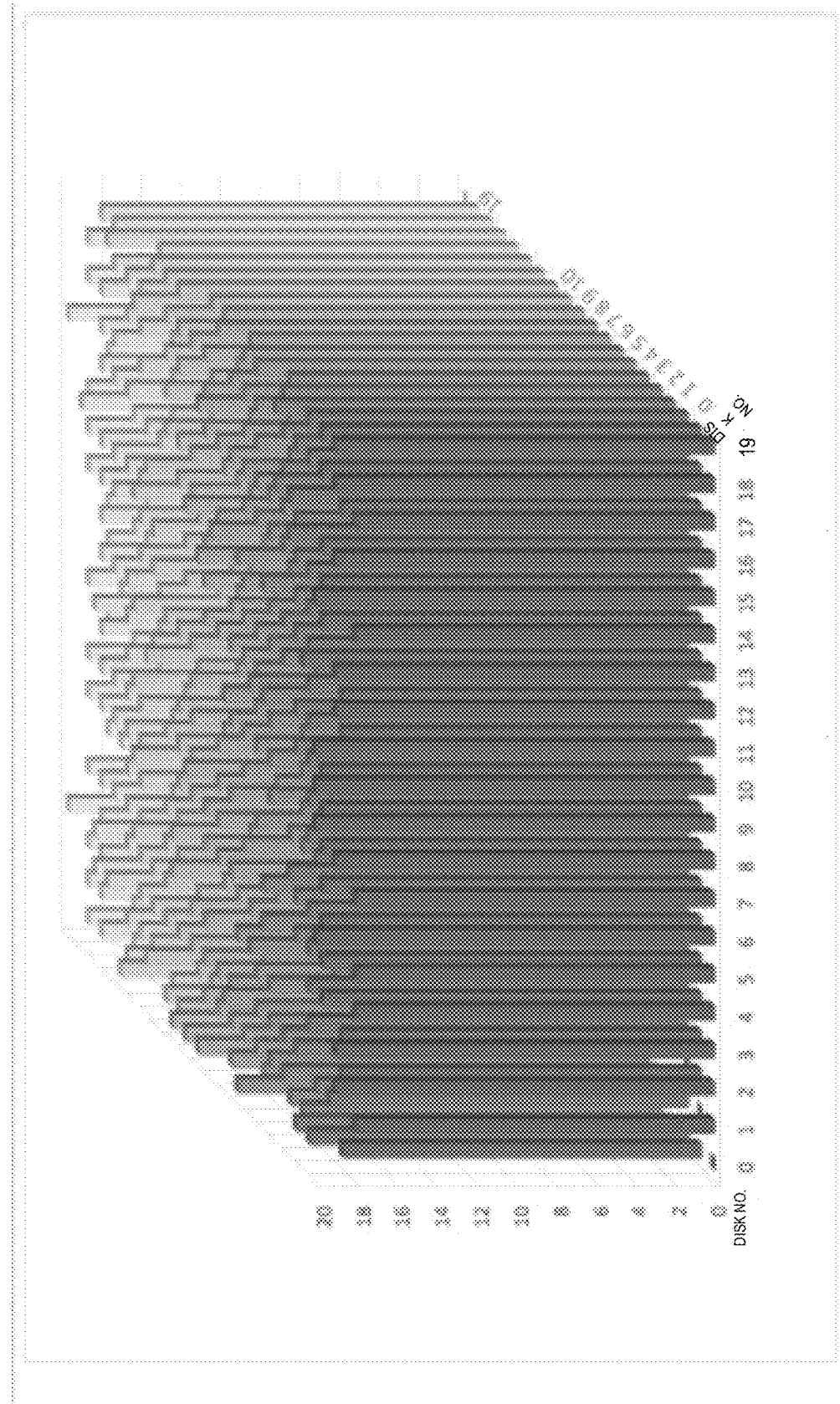
FIG. 2B visually illustrates in three dimensions a schematic diagram of a neighborhood matrix corresponding to an evenly-distributed RAID.

If disk extents contained in the RAID extent group 112 in RAID 110 are distributed evenly on pool 120, elements in the neighborhood matrix M should be close to each other. Therefore, the target of the neighborhood matrix algorithm is to make each element in the neighborhood matrix M substantially the same after RAID extent allocation is completed. FIG. 2A and FIG. 2B visually illustrate a neighborhood matrix with elements being substantially identical in two dimensions and three dimensions, respectively. In the example shown in FIG. 2A and FIG. 2B, the number N of disks in the pool 120 is 20, which is only illustrative, and N may take different values depending on the adopted RAID policy. As shown in FIG. 2A and FIG. 2B, through neighborhood matrix algorithm, the values of elements in the matrix are substantially the same. That is, RAID corresponding to the neighborhood matrix shown in FIG. 2A and FIG. 2B is distributed evenly on the pool.

Now, returning to FIG. 1, in embodiments of the present disclosure, the controller 130 expands the pool 120 using expanding disks $120_{n+1}$ ... $120_N$ so as to rebuild RAID 110 based on the expanded pool 120, so that RAID extent in the rebuilt RAID 110 comprises disk extents of different disks in the existing disks $120_1$, $120_2$, $120_3$, $120_4$ ... $120_n$ and expanding disks $120_{n+1}$ ... $120_N$, The controller 130 estimates the count of data movement to be performed between the existing disks $120_1$, $120_2$, $120_3$, $120_4$ ... $120_n$ and expanding disks $120_{n+1}$ ... $120_N$ during the process of rebuilding RAID 110 so that the rebuilt RAID 110 is distributed evenly in the expanded pool 120, namely, making elements in the neighborhood matrix associated with the rebuilt RAID 110 substantially the same. The controller 130 provides time information associated with rebuilding to the user based on the estimated count of movement.

Different from the conventional approach, in embodiments of the present disclosure, the controller 130 does not need to simulate the complicated data movement between the existing disks $120_1, 120_2, 120_3, 120_4 \ldots 120_n$ and expanding disks $120_{n+1} \ldots 120_N$ but determines count of data movement between expanding disks $120_{n+1} \ldots 120_N$ and existing disks $120_1, 120_2, 120_3, 120_4 \ldots 120_n$ during the rebuilding process based on the number of RAID extents 116 contained in the RAID extent group 112 in the rebuilt RAID 110, the number of expanding disks $120_{n+1} \ldots 120_N$, the number of existing disks $120_1, 120_2, 120_3, 120_4 \ldots 120_n$ and the predetermined extent width of RAID. The scheme proposed in the present disclosure will be described below in detail.

Figure 3:
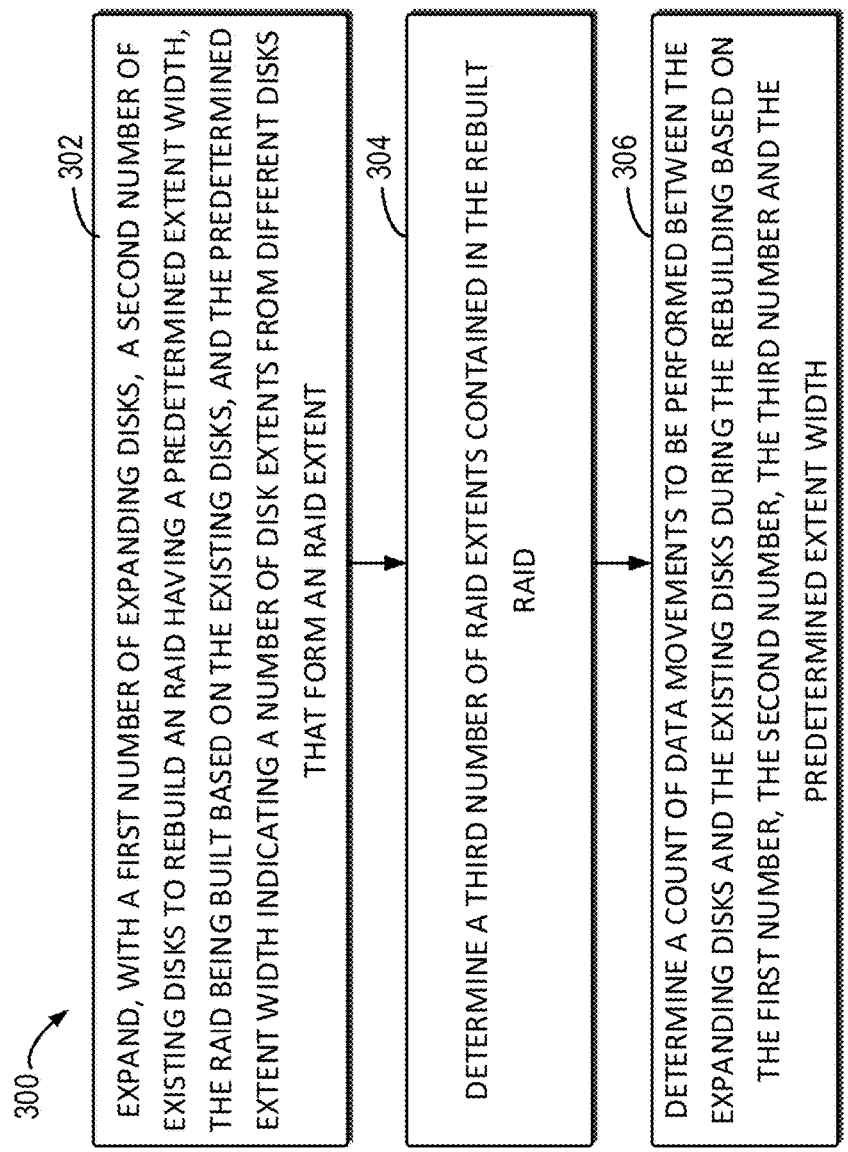
FIG. 3 is a flowchart illustrating a method for managing a storage system in accordance with embodiments of the present disclosure.

FIG. 3 is a flowchart illustrating a method 300 for managing a storage system in accordance with embodiments of the present disclosure. Method 300 may be executed by the controller 130 shown in FIG. 1.

At 302, the controller 130 expands a second number OLD_DISK_CNT of existing disks with a first number NEW_DISK_CNT of expanding disks, so as to rebuild RAID with a predetermined extent width W. RAID is already built based on the existing disks, and the predetermined extent width W represents the number of disk extents from different disks which form an RAID extent. As stated above, the second number OLD_DISK_CNT depends on the adopted RAID policy, and in the embodiments of the present disclosure, the second number OLD_DISK_CNT is greater than or equal to the predetermined extent width W. The second number OLD_DISK_CNT is an integer larger than 0.

At 304, the controller 130 determines a third number of RAID extents contained in the rebuilt RAID. In embodiments of the present disclosure, in response to the predetermined extent width W being greater than the first number NEW_DISK_CNT, the third number is determined to be equal to the number OLD_RE_CNT of RAID extents contained in RAID built based on the existing disks. In response to the predetermined extent width W being smaller than or equal to the first number NEW_DISK_CNT, the third number is determined to be equal to a sum of the number OLD_RE_CNT of RAID extents contained in the RAID extent group built based on the existing disks and the number NEW_RE_CNT of RAID extents contained in the RAID extent group that can be built solely based on the expanding disks.

At 306, the controller 130 determines the count of data movement to be performed between expanding disks and existing disks during the rebuilding based on the first number NEW_DISK_CNT, the second number OLD_DISK_CNT, the third number and the predetermined extent width W.

Figure 4:
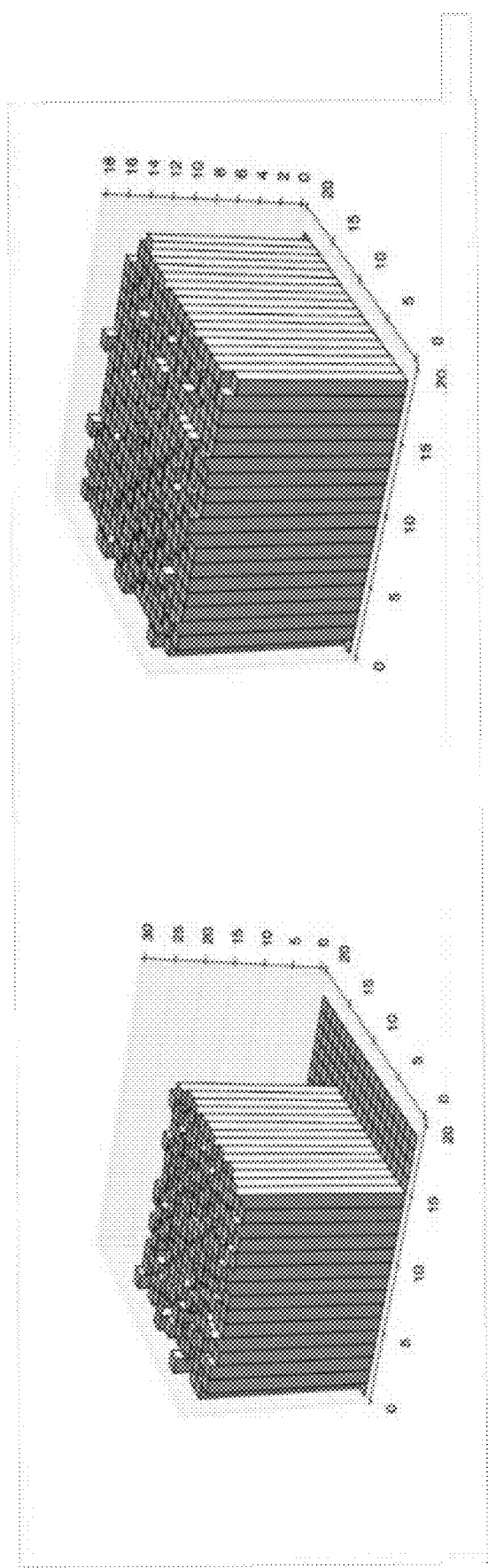
FIG. 4 is a schematic diagram illustrating a neighborhood matrix before and after required count of data movement in accordance with embodiments of the present disclosure.

If the first number NEW_DISK_CNT (namely, the number of expanding disks) is smaller than the predetermined extent width W, then it is impossible to build the RAID extent group directly on the expanding disk. This is because for each RAID extent, disk extents from W disks must be allocated to it, while disk extents that meet this requirement cannot be allocated only using the expanding disk. Under this condition, as illustrated in FIG. 4, in order to make a RAID extent group of the rebuilt RAID distribute evenly both on the expanding disks and the existing disks, it is only necessary to move data from the existing disks to the expanding disks. FIG. 4 illustrates a neighborhood matrix of the RAID before and after a required count of data movement from existing disks to expanding disks is performed.

To this end, for the case that the first number NEW_DISK_CNT is smaller than the predetermined extent width W, in embodiments of the present disclosure, the first count of data movement to be performed from existing disks to expanding disks during the rebuilding process is determined as the count based on the first number NEW_DISK_CNT, the second number OLD_DISK_CNT, and the third number (at this point, the third number is OLD_RE_CNT) and the predetermined extent width W. In this case, the controller 130 may calculate the count SHUFFLE_MOVEMENT_CNT based on the following equation:

$$\text{SHUFFLE\_MOVEMENT\_CNT} = \text{OLD\_RE\_CNT} * W * \text{NEW\_DISK\_CNT}/(\text{OLD\_DISK\_CNT} + \text{NEW\_DISK\_CNT}).$$

where OLD_RE_CNT*W represents the number of disk extents for rebuilding RAID in the existing disks and the expanding disks. NEW_DISK_CNT/(OLD_DISK_CNT+NEW_DISK_CNT) represents the ratio of the expanding disks in the expanding disks and the existing disks.

Figure 5:
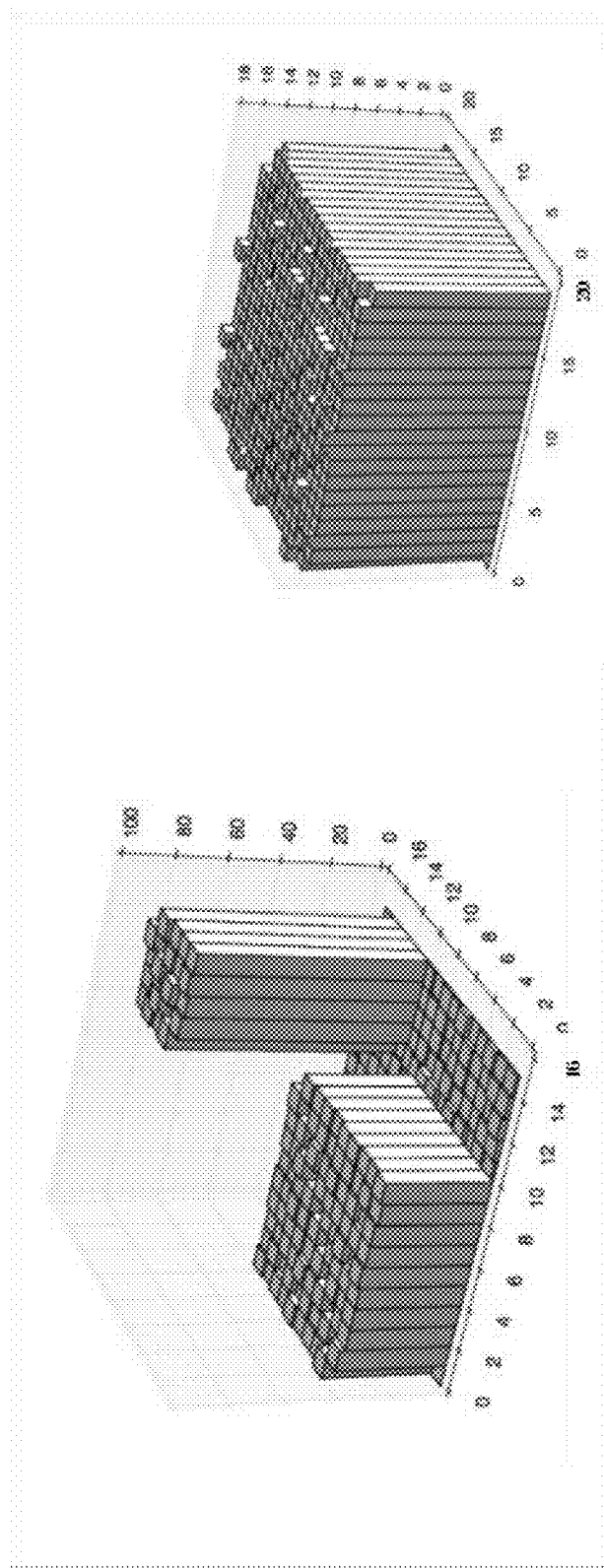
FIG. 5 is a schematic diagram illustrating a neighborhood matrix before and after required count of data movement in accordance with embodiments of the present disclosure.

If the first number NEW_DISK_CNT is larger than or equal to the predetermined extent width W, then a new RAID extent group may be built separately on the expanding disk directly. However, at this point, there are not neighborhood relationships between the existing disks and expanding disks, that is, in the neighborhood matrix, M (i, j) is zero, where disk i is an existing disk, and disk j is an expanding disk. As illustrated in FIG. 5, in order to improve IO performance of the rebuilt RAID, it is necessary to perform data movement between the existing disks and the expanding disks, so that the RAID extent group of the rebuilt RAID is distributed evenly on the existing disks and the expanding disks. FIG. 5 illustrates a neighborhood matrix before and after required count of data movement is performed between existing disks and expanding disks.

For this purpose, for the case that the first number NEW_DISK_CNT is greater than or equal to the predetermined extent width W, in embodiments of the present disclosure, the controller 130 determines, based on the first number NEW_DISK_CNT, the second number OLD_DISK_CNT, the third number (as indicated above, the third number now is a sum of OLD_RE_CNT and OLD_RE_CNT) and the predetermined extent width W, the first count of data movement to be performed from the existing disks to the expanding disks during the rebuilding process and the second count of data movement to be performed from the expanding disks to the existing disks. The detailed process of determining the first count and second count will be described below with reference to FIG. 6. Afterwards, the controller 130 determines total count of data movement between the existing disks and expanding disks based on a sum of the determined first count and second count.

In accordance with method 300 as illustrated in FIG. 3, it is only necessary to obtain the first number NEW_DISK_CNT, the second number OLD_DISK_CNT, the third number and the predetermined extent width W to determine how many instances of data movement are required during the rebuilding process to enable disk extents in the RAID extent group in the rebuilt RAID to be distributed evenly on the existing disks and expanding disks, thereby avoiding simulation of these data movements, saving computing resources and quickly obtaining the required count of movement.

Additionally, according to method 300, the controller 130 may further provide time information associated with rebuilding the RAID to the user based on the determined count. In embodiments of the present disclosure, the controller 130 may determine the time required for rebuilding RAID based on the determined count and the time required by each data movement.

Figure 6:
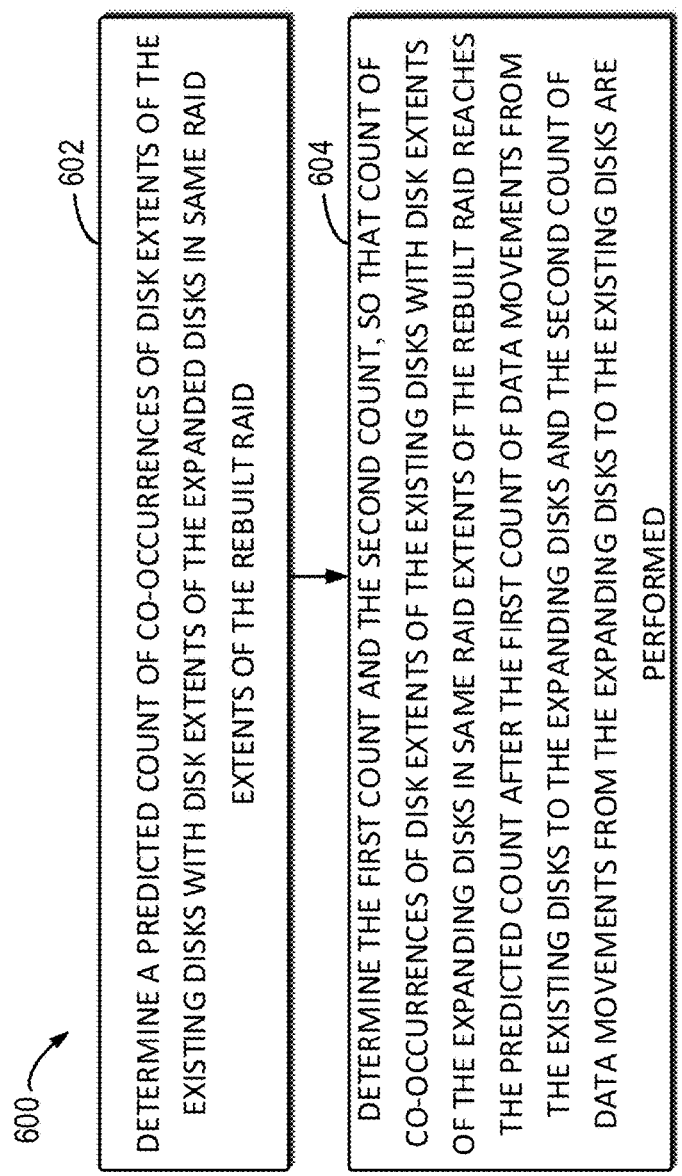
FIG. 6 is a flowchart illustrating a method for determining a first count of data movement to be performed from existing disks to expanding disks and a second count of data movement to be performed from expanding disks to existing disks during a rebuilding process.

FIG. 6 is a flowchart illustrating a method 600 for determining a first count of data movement to be performed from the existing disks to the expanding disks and a second count of data movement to be performed from the expanding disks to the existing disks during the rebuilding process. The method 600 is an implementation of the block 306 shown in FIG. 3 and may be executed by the controller 130 shown in FIG. 1.

At 602, the controller 130 determines a predicted count of co-occurrences for disk extents of the existing disk with disk extents of the expanding disk in the same RAID extents of the rebuilt RAID based on the first number NEW_DISK_CNT, the second number OLD_DISK_CNT, the third number (a sum of OLD_RE_CNT and OLD_RE_CNT) and the predetermined extent width W.

In embodiments of the present disclosure, the controller 130 determines, based on the third number and the predetermined extent width W, the required count of co-occurrences for disk extents of the existing disks and the expanding disks with each other in the same RAID extents of the rebuilt RAID; and determines the predicted count based on the determined required count, the first number and the second number.

Figure 7:
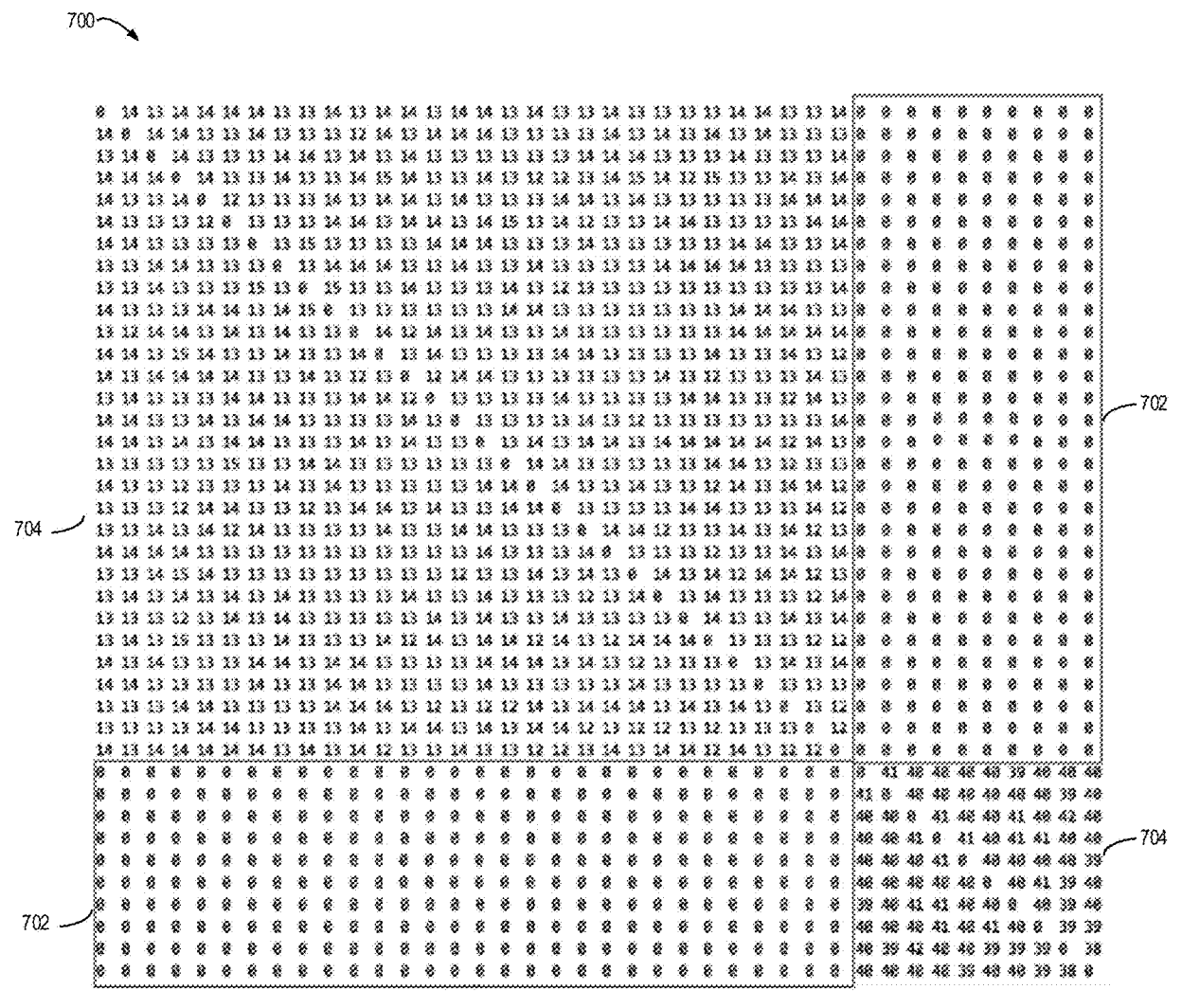

Reference will be made to FIG. 7 to describe how to determine the predicted count. FIG. 7 is a schematic diagram illustrating a neighborhood matrix 700 without any data movement. Before data movement is performed, the neighborhood matrix 700 of N*N has two zero zones 702 and two non-zero zones 704, where N=NEW_DISK_CNT+OLD_DISK_CNT. The purpose of data movement between existing disks and expanding disks is to fill the zero zone 702, so that the elements in the zero zone 702 are as similar as possible to elements in the non-zero zone 704, namely, RAID extent groups of the rebuilt RAID are distributed evenly on the existing disks and the expanding disks.

Each RAID extent will introduce W*(W−1) neighbor relations. Therefore, the contribution of each RAID extent to a sum of all the elements in the neighborhood matrix is W*(W−1). The rebuilt RAID has a third number (a sum of OLD_RE_CNT and OLD_RE_CNT) of RAID extents in total. Thus, the sum of all the elements of the neighborhood matrix when RAID extent groups are distributed evenly is (OLD_RE_CNT+NEW_RE_CNT)*W*(W−1), which also represents the count of co-occurrences for disk extents of the existing disks and the expanding disks with each other in the same RAID extents in the rebuilt RAID.

Considering that elements on the diagonal line are zero, after the required count of data movement is performed, the number of all the non-zero elements of the neighborhood matrix 700 should be N*(N−1). Thus, the average of these non-zero elements should be:

$$AVG = \frac{(OLD\_RE\_CNT + NEW\_RE\_CNT) * W * (W - 1)}{N * (N - 1)} \quad (1)$$

where OLD_RE_CNT represents the number of RAID extents built solely based on the existing disks, NEW_RE_CNT represents the number of RAID extents built solely based on the expanding disks, W represents the predetermined extent width, and N represents a sum of existing disks and expanding disks. In embodiments of the present disclosure, N=NEW_DISK_CNT+OLD_DISK_CNT.

In the zero zone 702 illustrated in FIG. 7, there are OLD_DISK_CNT*NEW_DISK_CNT elements in total. After the required count of data movement is performed, the predicted sum of elements in the zero zone 702 should be:

$$EXPECTED\_SUM\_ZERO\_ZONE = OLD\_DISK\_CNT * NEW\_DISK\_CNT * AVG \quad (2)$$

where OLD_DISK_CNT represents the number of existing disks, and NEW_DISK_CNT represents the number of expanding disks. In embodiments of the present disclosure, EXPECTED_SUM_ZERO_ZONE represents the predicted count of co-occurrences for the disk extents of the existing disks with the disk extents of the expanding disks in the same RAID extents of the rebuilt RAID.

Referring back to FIG. 6, at 604, the controller 130 determines a first count of data movement to be performed from the existing disks to the expanding disks and a second count of data movement to be performed from the expanding disks to the existing disks, so that the count of co-occurrences for the disk extents of the existing disks with the disk extents of the expanded disks in the same RAID extents of the rebuilt RAID reaches the predicted count after the first count of data movement from the existing disks to the expanding disks and the second count of data movement from the expanding disks to the existing disks are performed.

In accordance with method 600 shown in FIG. 6, it is only necessary to obtain the first number NEW_DISK_CNT, the second number OLD_DISK_CNT, the third number and the predetermined extent width W to determine a predicted count of co-occurrences for the disk extents of the existing disks with the disk extents of the expanding disks in the same RAID extents of the rebuilt RAID, so as to determine how many instances of data movement are required during the rebuilding based on the predicted count to enable disk extents in the RAID extent groups of the rebuilt RAID to be distributed evenly on the existing disks and expanding disks. In this way, simulation of these data movements can be avoided, computing resources can be saved, and the required count of movement can be obtained quickly.

Figure 9:
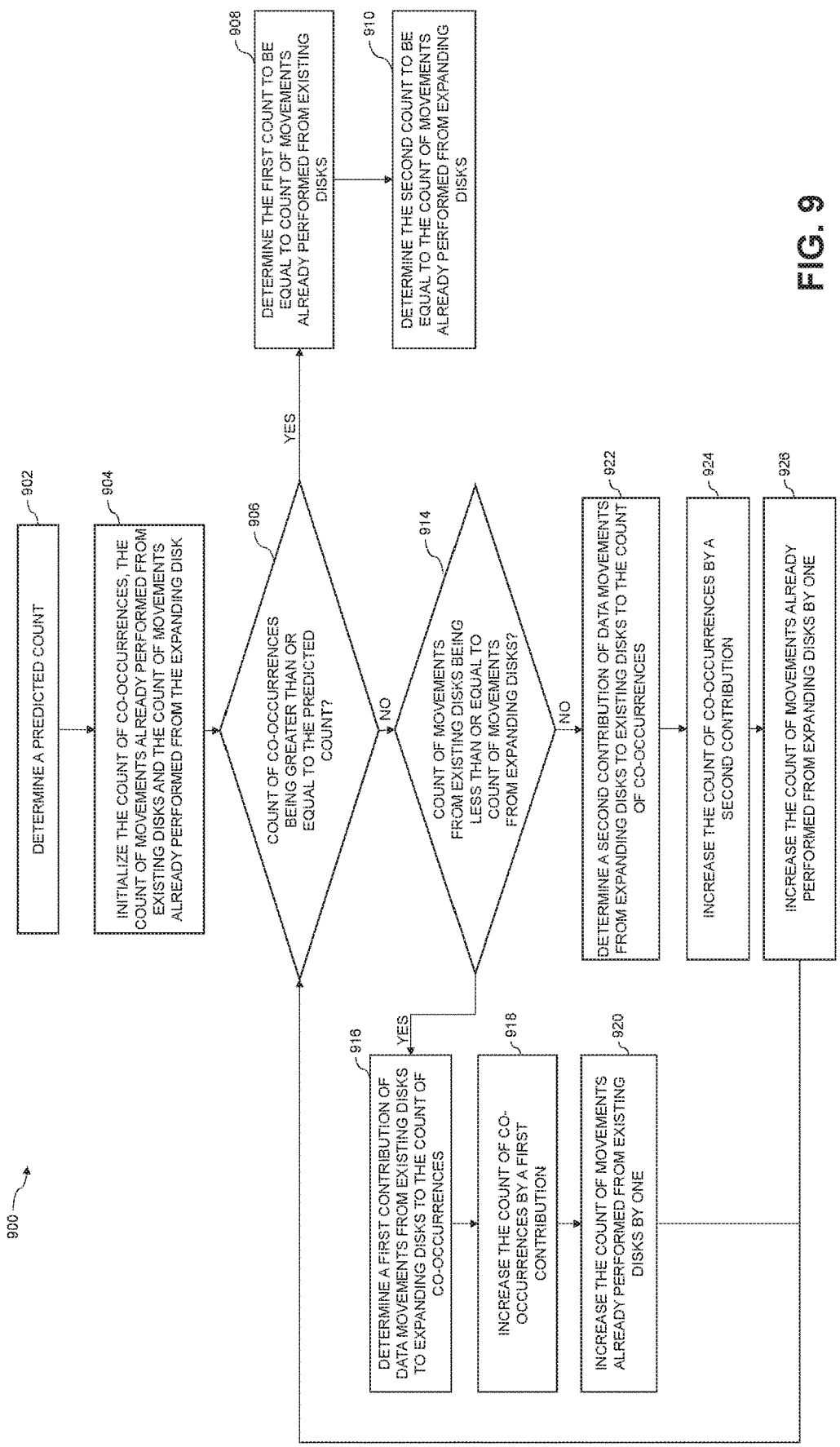
FIG. 9 is a flowchart illustrating a method for determining a first count of data movement to be performed from existing disks to expanding disks and a second count of data movement to be performed from expanding disks to existing disks during a rebuilding process.

FIG. 9 is a flowchart illustrating a method 900 for determining a first count of data movement to be performed from the existing disks to the expanding disks and a second count of data movement to be performed from the expanding disks to the existing disks during the rebuilding process. Method 900 is a specific implementation of method 600 and may be executed by the controller 130 shown in FIG. 1. To facilitate understanding, some basic concepts will be described before FIG. 9 is described in detail.

Figure 8:
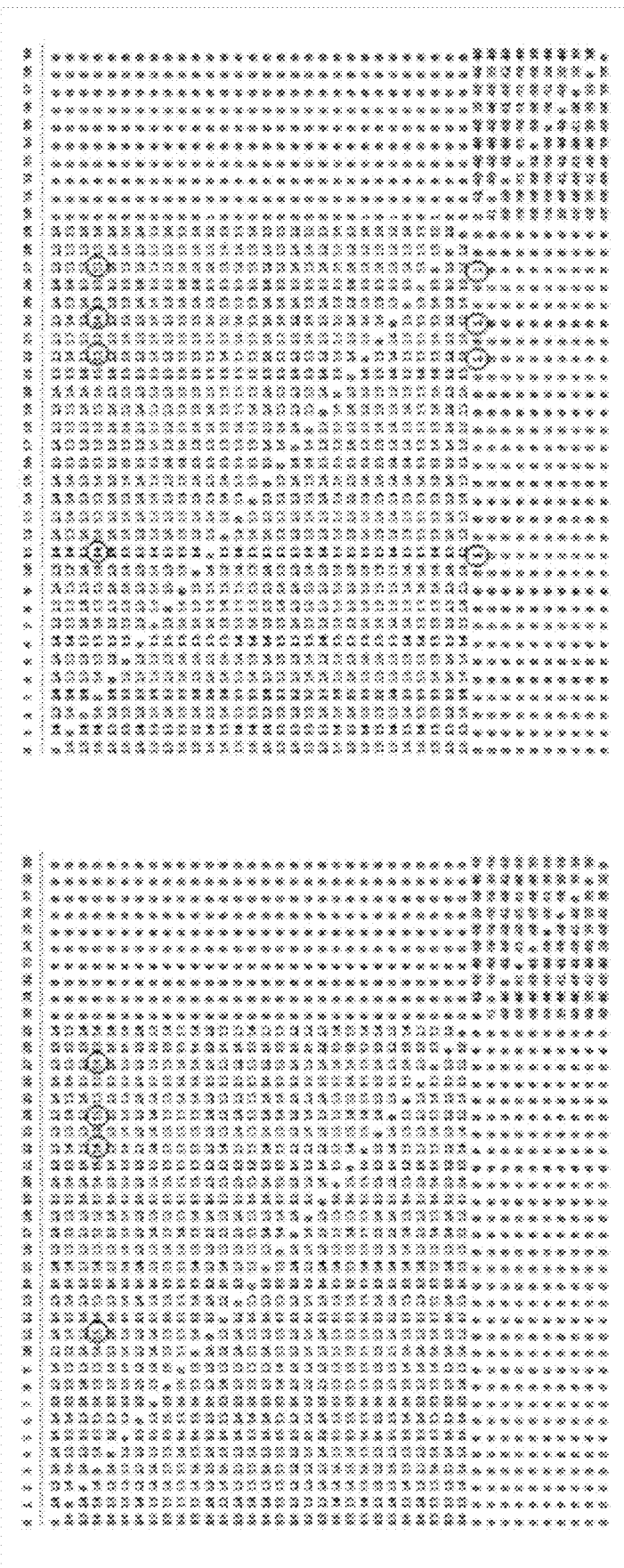
FIG. 8 is a schematic diagram of changes of a neighborhood matrix before and after one data movement.

Each data movement from the existing disks to the expanding disks or from the expanding disks to the existing disks would make a contribution to the count of the disk extents of the existing disks co-occurring with the disk extents of the expanding disks in the same RAID extents of the RAID. Reference will be made to FIG. 8 to describe how to determine the contribution of each movement to the count of co-occurrences.

FIG. 8 is a schematic diagram illustrating a neighborhood matrix before and after one data movement. In the embodiment shown in FIG. 8, the predetermined extent width W is 5, the first number of expanding disks is 10 and the second number of expanding disks is 30. It is to be understood that these numbers are only exemplary and embodiments of the present disclosure are not limited in this regard. As illustrated by a matrix at the left in FIG. 8, there is an RAID extent which comprises disk extents of existing disks 3, 11, 22, 24 and 27. After data in the disk extent of the existing disk 3 is moved to expanding disk 30, M(3,11), M(3,22), M(3,24), M(3,27) are reduced by 1, respectively, while M(30,11), M(30,22), M(30,24), M(30,27) are increased by 1, respectively. In this example, data is moved for one time from the existing disk 3 to the expanding disk 30 and the contribution to the co-occurrences of the existing disk and the expanding disk in the same RAID extents is 4.

More generally, if an RAID extent includes x disk extents from the expanding disks and y disk extents from the existing disks (x+y=W), the movement of data in this RAID extent from a disk extent of the existing disk to the expanding disks will contribute y−1−x to the above count of co-occurrences. The reason is that after data in the existing disk is moved to the expanding disk, since y−1 neighboring relations are created between the expanding disks and the existing disks, y−1 points are increased in the zero zone, and meanwhile, since x relations between the expanding disks and the existing disks are dissolved due to this movement, x points will be reduced. Considering x+y=W, the contribution is W−1−2*x. This means that in an RAID extent, if x data movements are performed from one party to the other, when one data movement is performed again from this party to the other party, the contribution to the above count of co-occurrences will be W−1−2*x.

Thus, the contribution of one data movement to the count of co-occurrences of existing disks with expanded disks in the same RAID extents depends on how many disk extents have been moved, and the more the disk extents are moved, the less the contribution will be. Therefore, in embodiments of the present disclosure, it is not the case that data are moved from the disk extents of one party to the other party continuously in a one-way direction, otherwise the reserved (free) disk extents of the other party will be consumed quickly. Conversely, in the embodiments of the present disclosure, data are moved alternatively so as to maintain free disk extents of two parties balanced.

After the above concepts are understood, reference will now be made to FIG. 9. At 902, the controller 130 determines the predicted count of co-occurrences of the disk extents of the existing disks with the disk extents of the expanding disk in the same RAID extents of the rebuilt RAID based on equations (1) and (2).

At 904, the controller 130 initializes the count of co-occurrences of the disk extents of the existing disks with the disk extents of the expanding disks in the same RAID extents of the rebuilt RAID, count of movements already performed from the existing disks, and count of movements already performed from the expanding disk as zero, respectively.

At 906, the controller 130 determines whether the count of co-occurrences is greater than or equal to the predicted count determined at 902. At 908, in response to the count of co-occurrences being greater than or equal to the determined predicted count, the first count of data movements to be performed from the existing disks to the expanding disks during the rebuilding process is determined to be equal to the count of movements already performed from the existing disks. At 910, the second count of data movements to be performed from the expanding disks to the existing disks during the rebuilding process is determined to be equal to the count of movements already performed from the expanding disks.

At 914, in response to the count of co-occurrences being smaller than the predicted count, it is determined whether the count of movements already performed from the existing disks is smaller than or equal to the count of movements already performed from the expanding disk. At 916, in response to the count of movements already performed from the existing disks being smaller than or equal to the count already performed from the expanding disk, a first contribution of data movement from the existing disks to the expanding disk to the count of co-occurrences is determined. In embodiments of the present disclosure, the first contribution is determined based on W−1−OLD_DISK_EXTENT_MOVE_CNT/OLD_RE_CNT*2, where OLD_DISK_EXTENT_MOVE_CNT represents the count of movements from the existing disks. In embodiments of the present disclosure, OLD_DISK_EXTENT_MOVE_CNT/OLD_RE_CNT is integer division.

At 918, the first contribution is added to the count of co-occurrences. At 920, the count of movements already performed from the existing disks is increased by one. Then method 900 proceeds to 906.

At 922, in response to the count of movements already performed from the existing disks being greater than the count of movements already performed from the expanding disks, a second contribution of data movement from the expanding disks to the existing disks to the count of co-occurrences is determined. In embodiments of the present disclosure, the second contribution is determined based on W−1−NEW_DISK_EXTENT_MOVE_CNT/NEW_RE_CNT*2, where NEW_DISK_EXTENT_MOVE_CNT represents the count of movements already moved from the existing disks, present embodiments of the disclosure, NEW_DISK_EXTENT_MOVE_CNT/NEW_RE_CNT is integer division. At 924, the second contribution is added to the count of co-occurrences. At 926, the count of movements already moved from the expanding disks is increased by one. Then method 900 proceeds to 906.

In method 900, data are moved alternatively between the existing disks and the expanding disks. If one movement has greater contribution to the count of co-occurrences, then this data movement is selected so make the total count of movements as small as possible.

According to method 900 illustrated in FIG. 9, the count of data movements between the existing disks and the expanding disks during the rebuilding process may be determined only based on the number of existing disks, the number of expanding disks, the predetermined extent width of RAID and the number of RAID extents contained in the rebuilt RAID, without simulating data movement. Thus, the required count of data movement may be determined quickly so as to provide time estimate for rebuilding to the user quickly.

Figure 10:
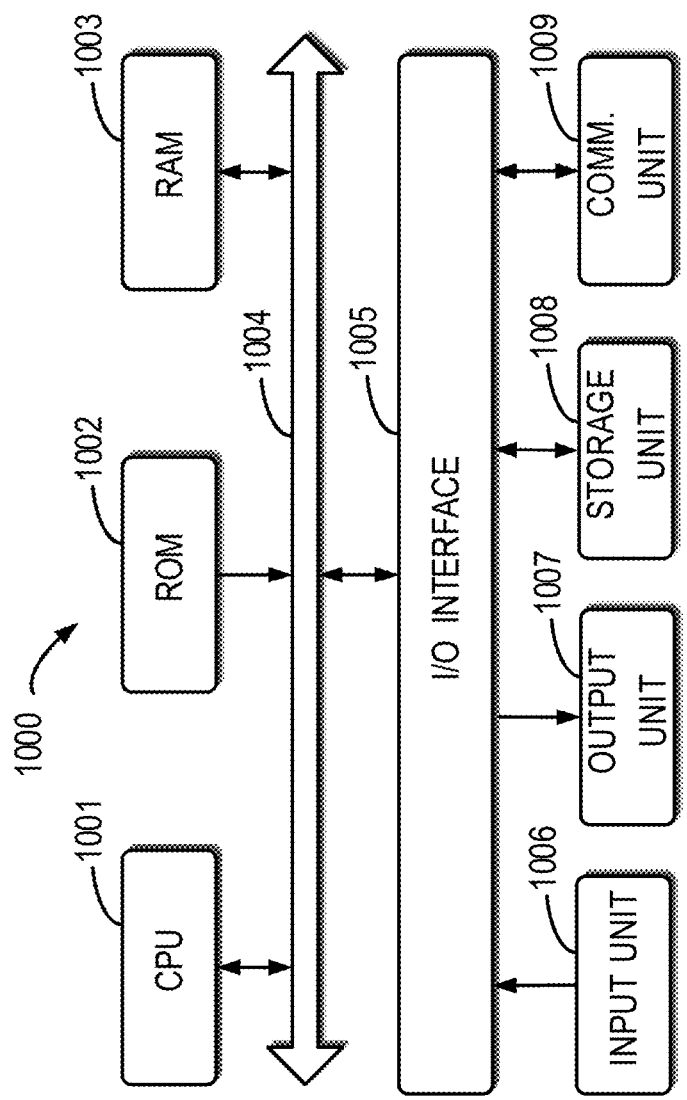
FIG. 10 is a block diagram illustrating an example device capable of implementing embodiments of the present disclosure.

FIG. 10 is a schematic block diagram illustrating an example device 1000 that may be used to implement embodiments of the present disclosure. The device 1000 may be used to implement controller 130 shown in FIG. 1. As illustrated, the device 1000 includes a central processing unit (CPU) 1001, which may execute various appropriate actions and processing based on the computer program instructions stored in a read-only memory (ROM) 1002 or the computer program instructions loaded into a random access memory (RAM) 1003 from a storage unit 1008. The RAM 1003 also stores all kinds of programs and data required by operating the device 1000. CPU 1001, ROM 1002 and RAM 1003 are connected to each other via a bus 1004 to which an input/output (I/O) interface 1005 is also connected.

A plurality of components in the device 1000 are connected to the I/O interface 1005, including: an input unit 1006, such as a keyboard, mouse and the like; an output unit 1007, such as various types of displays, loudspeakers and the like; a storage unit 1008, such as a magnetic disk, optical disk and the like; and a communication unit 1009, such as network card, modem, wireless communication transceiver and the like. The communication unit 1009 allows the device 1000 to exchange information/data with other devices through computer networks such as Internet and/or various telecommunication networks.

Each procedure and processing described above, such as method 300, method 600 and/or method 900, may be executed by a processing unit 1001. For example, in some embodiments, the method 300, method 600 and/or method 900 may be implemented as computer software programs, which are tangibly embodied in a machine-readable medium, such as storage unit 1008. In some embodiments, the computer program can be partially or completely loaded and/or installed to the device 1000 via ROM 1002 and/or the communication unit 1009. When the computer program is loaded to RAM 1003 and executed by CPU 1001, one or more steps of the above described method 300, method 600 and/or method 900 are implemented. Alternatively, in other embodiments, CPU 1001 may be configured to implement method 300, method 600 and/or method 900 in any other proper manner (for instance, by means of firmware).

The functionally described herein may be performed, at least in part, by one or more hardware logic components. For example, and without limitation, illustrative types of hardware logic components that may be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may be executed entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations to the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A method for managing a storage system, comprising:
   expanding, with a first number of expanding disks, a second number of existing disks to rebuild a redundant array of independent disks (RAID) having a predetermined extent width, the RAID being built based on the existing disks, and the predetermined extent width indicating a number of disk extents from different disks that form an RAID extent;
   determining a third number of RAID extents contained in the rebuilt RAID; and
   determining, based on the first number, the second number, the third number and the predetermined extent width, a count of data movements to be performed between the expanding disks and the existing disks during the rebuilding;
   wherein determining the count comprises:
   comparing the first number with the predetermined extent width; and
   in response to the first number being less than the predetermined extent width:
   determining, based on the first number, the second number, the third number and the predetermined extent width, a first count of data movements to be performed from the existing disks to the expanding disks during the rebuilding.

2. The method according to claim 1, wherein determining the first count comprises:
   determining, based on the third number and the predetermined extent width, a fourth number of disk extents for the rebuilding in the existing disks and the expanding disks;
   determining a ratio of the first number of the expanding disks to a total number of the expanding disks and the existing disks, the total number being a sum of the first number and the second number; and
   determining, based on the fourth number and the ratio, a number of disk extents for the rebuilding in the expanding disks as the first count.

3. The method according to claim 1 further comprising in response to the first number being greater than or equal to the predetermined extent width:
   determining, based on the first number, the second number, the third number and the predetermined extent width, the first count of data movements to be performed from the existing disks to the expanding disks and a second count of data movements to be performed from the expanding disks to the existing disks during the rebuilding; and determining the count based on the first count and the second count.

4. The method according to claim 3, wherein determining the first count and the second count comprises:

determining, based on the first number, the second number, the third number and the predetermined extent width, a predicted count of co-occurrences for disk extents of the existing disks with disk extents of the expanding disks in same RAID extents of the rebuilt RAID; and determining the first count and the second count, so that a count of co-occurrences for disk extents of the existing disks with disk extents of the expanding disks in same RAID extents of the rebuilt RAID reaches the predicted count after the first count of data movements from the existing disks to the expanding disks and the second count of data movements from the expanding disks to the existing disks are performed.

5. The method according to claim 4, wherein determining the predicted count comprises:

determining, based on the third number and the predetermined extent width, a fifth count of co-occurrences for disk extents of the existing disks and the expanding disks with each other in a same RAID extent of the rebuilt RAID; and determining the predicted count based on the fifth count, the first number and the second number.

6. The method according to claim 1, further comprising: determining time required by the rebuilding based on the count.

7. The method of claim 1, further comprising defining a pool of storage disks for storing data in accordance with the RAID utilizing a mapped RAID arrangement, wherein the first number of expanding disks and the second number of existing disks are part of the pool of storage disks.

8. An electronic device, comprising:
at least one processor; and
at least one memory containing computer program instructions, the at least one memory and the computer program instructions being configured to, together with the at least one processor, cause the electronic device to perform acts including:
expanding, with a first number of expanding disks, a second number of existing disks to rebuild a redundant array of independent disks (RAID) having a predetermined extent width, the RAID being built based on the existing disks, and the predetermined extent width indicating a number of disk extents from different disks that form an RAID extent;
determining a third number of RAID extents contained in the rebuilt RAID; and
determining, based on the first number, the second number, the third number and the predetermined extent width, a count of data movements to be performed between the expanding disks and the existing disks during the rebuilding
wherein the acts further comprise:
comparing the first number with the predetermined extent width; and
in response to the first number being less than the predetermined extent width:
determining, based on the first number, the second number, the third number and the predetermined extent width, a first count of data movements to be performed from the existing disks to the expanding disks during the rebuilding.

9. The electronic device according to claim 8 wherein the acts further comprise:

determining, based on the third number and the predetermined extent width, a fourth number of disk extents for the rebuilding in the existing disks and the expanding disks;

determining a ratio of the first number of the expanding disks to a total number of the expanding disks and the existing disks, the total number being a sum of the first number and the second number; and determining, based on the fourth number and the ratio, a number of disk extents for the rebuilding in the expanding disks as the first count.

10. The electronic device according to claim 8, wherein the acts further comprise:

in response to the first number being greater than equal to the predetermined extent width, determining, based on the first number, the second number, the third number and the predetermined extent width, the first count of data movements to be performed from the existing disks to the expanding disks and a second count of data movements to be performed from the expanding disks to the existing disks during the rebuilding; and determining the count based on the first count and the second count.

11. The electronic device according to claim 10, wherein the acts further comprise:

determining, based on the first number, the second number, the third number and the predetermined extent width, a predicted count of co-occurrences for disk extents of the existing disks with disk extents of the expanding disks in same RAID extents of the rebuilt RAID; and determining the first count and the second count, so that a count of co-occurrences for disk extents of the existing disks with disk extents of the expanding disks in same RAID extents of the rebuilt RAID reaches the predicted count after the first count of data movements from the existing disks to the expanding disks and the second count of data movements from the expanding disks to the existing disks are performed.

12. The electronic device according to claim 11, wherein the acts further comprise:

determining, based on the third number and the predetermined extent width, a fifth count of co-occurrences for disk extents of the existing disks and the expanding disks with each other in a same RAID extent of the rebuilt RAID; and determining the predicted count based on the fifth count, the first number and the second number.

13. The electronic device according to claim 8, wherein the acts further comprise:

determining time required by the rebuilding based on the count.

14. A storage system comprising existing disks, expanding disks and the electronic device according to claim 8.

15. The electronic device according to claim 8, wherein the acts further comprise defining a pool of storage disks for storing data in accordance with the RAID utilizing a mapped RAID arrangement, wherein the first number of expanding disks and the second number of existing disks are part of the pool of storage disks.

16. A computer program product comprising a non-transitory computer storage medium having stored therein machine executable instructions of one or more software programs, wherein the machine executable instructions when executed by a machine, cause the machine:
- to expand, with a first number of expanding disks, a second number of existing disks to rebuild a redundant array of independent disks (RAID) having a predetermined extent width, the RAID being built based on the existing disks, and the predetermined extent width indicating a number of disk extents from different disks that form an RAID extent;
- to determine a third number of RAID extents contained in the rebuilt RAID; and
- to determine, based on the first number, the second number, the third number and the predetermined extent width, a count of data movements to be performed between the expanding disks and the existing disks during the rebuilding;

wherein determining the count comprises:

comparing the first number with the predetermined extent width; and in response to the first number being less than the predetermined extent width:
- determining, based on the first number, the second number, the third number and the predetermined extent width, a first count of data movements to be performed from the existing disks to the expanding disks during the rebuilding.

17. The computer program product according to claim 16, wherein determining the first count comprises:
- determining, based on the third number and the predetermined extent width, a fourth number of disk extents for the rebuilding in the existing disks and the expanding disks;
- determining a ratio of the first number of the expanding disks to a total number of the expanding disks and the existing disks, the total number being a sum of the first number and the second number; and
- determining, based on the fourth number and the ratio, a number of disk extents for the rebuilding in the expanding disks as the first count.

18. The computer program product according to claim 16 further comprising in response to the first number being greater than or equal to the predetermined extent width:
- determining, based on the first number, the second number, the third number and the predetermined extent width, the first count of data movements to be performed from the existing disks to the expanding disks and a second count of data movements to be performed from the expanding disks to the existing disks during the rebuilding; and
- determining the count based on the first count and the second count.

19. The computer program product according to claim 18, wherein determining the first count and the second count comprises:
- determining, based on the first number, the second number, the third number and the predetermined extent width, a predicted count of co-occurrences for disk extents of the existing disks with disk extents of the expanding disks in same RAID extents of the rebuilt RAID; and
- determining the first count and the second count, so that a count of co-occurrences for disk extents of the existing disks with disk extents of the expanding disks in same RAID extents of the rebuilt RAID reaches the predicted count after the first count of data movements from the existing disks to the expanding disks and the second count of data movements from the expanding disks to the existing disks are performed.

20. The computer program product according to claim 16, wherein the machine executable instructions when executed by the machine, further cause the machine to define a pool of storage disks for storing data in accordance with the RAID utilizing a mapped RAID arrangement, wherein the first number of expanding disks and the second number of existing disks are part of the pool of storage disks.

* * * * *